United States Patent [19]
Litz et al.

[11] Patent Number: 5,354,358
[45] Date of Patent: Oct. 11, 1994

[54] PROCESS FOR REMOVING URANIUM AND OTHER METALS FROM WASTES

[75] Inventors: John Litz, Lakewood; Nicholas J. Lombardo, Boulder; Robert L. Schwartz, Denver, all of Colo.

[73] Assignee: IC Technologies, Wheat Ridge, Colo.

[21] Appl. No.: 114,670

[22] Filed: Aug. 31, 1993

[51] Int. Cl.$^5$ ............................................. C01G 43/00
[52] U.S. Cl. ............................................. 75/711; 423/2
[58] Field of Search ........................... 423/2, 3; 75/711

[56] References Cited

U.S. PATENT DOCUMENTS 1,165,692 12/1915 Moore ..................................... 423/2
2,894,804 7/1959 Sawyer .................................... 423/2
4,461,747 7/1984 Fitoussi ................................... 423/2

Primary Examiner—Peter D. Rosenberg
Attorney, Agent, or Firm—Joseph S. Iandiorio; Kirk Teska

[57] ABSTRACT

A process for removing metals from a waste including uranium and a second metal comprising dissolving the uranium and the second metal in a first aqueous solution, removing the dissolved uranium from the first aqueous solution by redissolving in an organic solvent, stripping the uranium from the organic solvent by redissolving in a second aqueous solution, precipitating the uranium from the second aqueous solution, and removing the second metal from the first aqueous solution.

22 Claims, 5 Drawing Sheets

PROCESS FOR REMOVING URANIUM AND OTHER METALS FROM WASTES

FIELD OF INVENTION

This invention relates to a process for removing uranium and other metals from a waste which results in the production of uranium in a recyclable form, metals pure enough to be resold, and a non-radioactive, non-hazardous solid waste that may be landfilled.

BACKGROUND OF INVENTION

Depleted uranium has been used for years in the production of munitions. The neutralized waste products from such processes typically include metals such as copper and uranium in oxide or hydroxide form. Disposal of these wastes has increasingly become a problem.

Disposal options to date include burying the waste in liquid or dried form in a secure, lined, capped landfill to prevent water from percolating through the waste. Such disposal is problematic because there is always the chance that the basin will leak, there are fewer and fewer sites that will take such wastes, and the disposal is extremely expensive, running from $25.00 to $300.00 per cubic foot of waste. Often times this also involves trucking the waste across country, which adds to the expense and potential hazard. Another disposal option is glassification or state transformation in which the waste is first mixed with sand and then current is applied to melt the sand. The glassified solid waste product is more stable and thus is easier to dispose of. However, this process does not work well and is extremely expensive to conduct.

SUMMARY OF INVENTION

It is therefore an object of this invention to provide a process for removing uranium and other metals from waste.

It is a further object of this invention to provide such a process that produces a recyclable uranium product.

It is a further object of this invention to provide such a process which produces a recyclable non-uranium metallic product.

It is a further object of this invention to provide such a process which results in a single non-radioactive, non-hazardous solid waste by-product that may be disposed of in a landfill.

It is a further object of this invention to provide such a process which greatly decreases the cost of disposing of the waste.

It is a further object of this invention to provide such a process which decreases potential liability for waste disposal.

This invention results from the realization that uranium and copper present in a waste may be removed from the waste and recycled by dissolving the uranium and copper in a highly-acidic aqueous solution, extracting the dissolved uranium in a solvent extraction process, stripping the uranium from the solvent, precipitating the uranium from the stripping solution, and removing the copper from the uranium-free acidic solution using a combination electrowinning and copper cementation process to produce recyclable uranium trioxide and solid copper, leaving a non-radioactive, non-hazardous process tailing waste that can be disposed of in a landfill.

This invention features a process for removing uranium and at least a second metal from a waste. The process contemplates dissolving the uranium and the second metal in a first aqueous solution that is preferably an acidic solution. This may be accomplished with a multiple stage acid leaching process which may include an increased leachate acid concentration from the first to the last stage. Preferably, the process includes a sulfuric acid leach in the first two stages, and a more concentrated, heated, sulfuric and nitric acid leach in the third and fourth stages. The dissolved uranium is then removed from the first aqueous solution by redissolving the uranium in an organic solvent, which may be accomplished by contacting the first aqueous solution with an amine. The solvent extraction may be accomplished with a multiple stage solvent extraction process that is preferably countercurrent. The loaded organic solvent is then stripped of its uranium by redissolving the uranium in a second aqueous solution. This may be accomplished by contacting the loaded solvent with a soda ash solution. The stripping may take place in a multiple stage counter current stripping operation. The uranium is then precipitated from this second aqueous solution; the precipitation may be accomplished by contacting the second aqueous solution with an oxidizer such as hydrogen peroxide. The second metal is then removed from the first aqueous solution. This may be accomplished by electrowinning, and by cementation. The cementation may be accomplished by circulating the solution over iron.

The process may further include removing remaining dissolved uranium from the second aqueous solution after uranium precipitation from that solution. This may be accomplished with another solvent extraction step. The precipitated uranium may be calcined to produce a recyclable $UO_3$ product. Preferably, after the second metal is removed from the first aqueous solution, the solution is neutralized and then concentrated by evaporation. The second metal in one embodiment includes copper.

DISCLOSURE OF PREFERRED EMBODIMENTS

Other objects, features and advantages will occur to those skilled in the art from the following description of a preferred embodiment and the accompanying drawings in which.

This invention may be accomplished in a process for removing metals including uranium and at least another metal such as copper from a waste. The process contemplates dissolving the metals in a highly acidic aqueous solution in a number of leaching stages. The uranium is removed from the leachate using a solvent extraction process. The uranium is stripped from the solvent using an aqueous stripping solution from which the uranium may be precipitated and calcined to form recyclable uranium trioxide. The remaining acid leach solution then has the remaining dissolved metals, primarily copper, removed by electroplating followed by copper cementation. The resulting solution is neutralized, concentrated, and mixed with the solids from the leaching stage to form a unified tailings mixture that may be disposed of in an approved landfill.

Figure 1:
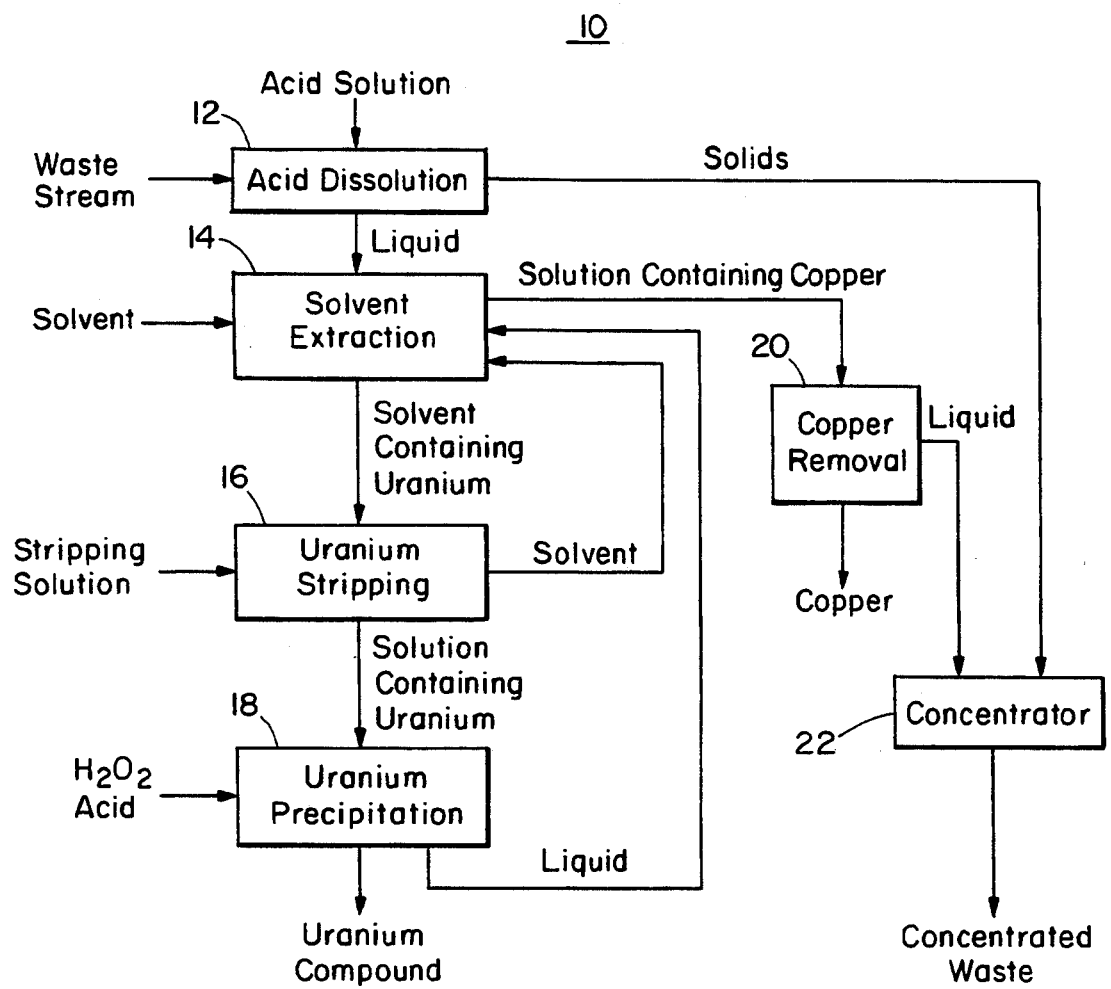
FIG. 1 is a block diagram of a metal removal process according to this invention.

There is shown in FIG. 1 metal removal process 10 according to this invention. The waste stream entering acid dissolution step 12 includes uranium and at least another metal such as copper. An acid solution is provided to dissolve the metals. The solids from the dissolution step are routed to concentrator 22, further described below. The liquid is provided to solvent extraction step 14, wherein a solvent is provided in which uranium is soluble, but not the other metals present in the waste stream, to extract the dissolved uranium from the solution. The loaded solvent is then provided to a uranium stripping step to which a stripping solution that is capable of removing the uranium from the solvent phase is also provided. Stripped solvent is returned to the extraction step 14. The uranium-containing solution from step 16 is then provided to a uranium precipitation step 18 in which the uranium is precipitated as $UO_4$ using hydrogen peroxide at an acidic pH. The remaining liquid is then returned to solvent extraction step 14 to provide a closed loop solvent extraction and stripping process.

The aqueous phase from solvent extraction step 14 containing dissolved metals such as copper is then provided to metal removal step 20 that may comprise one or more steps further described below. After metal removal, the remaining liquid is mixed with the solids from the acid dissolution step in concentrator 22 to make a concentrated solid or slurry waste that is capable of being disposed of in an appropriate landfill.

Figure 2A:
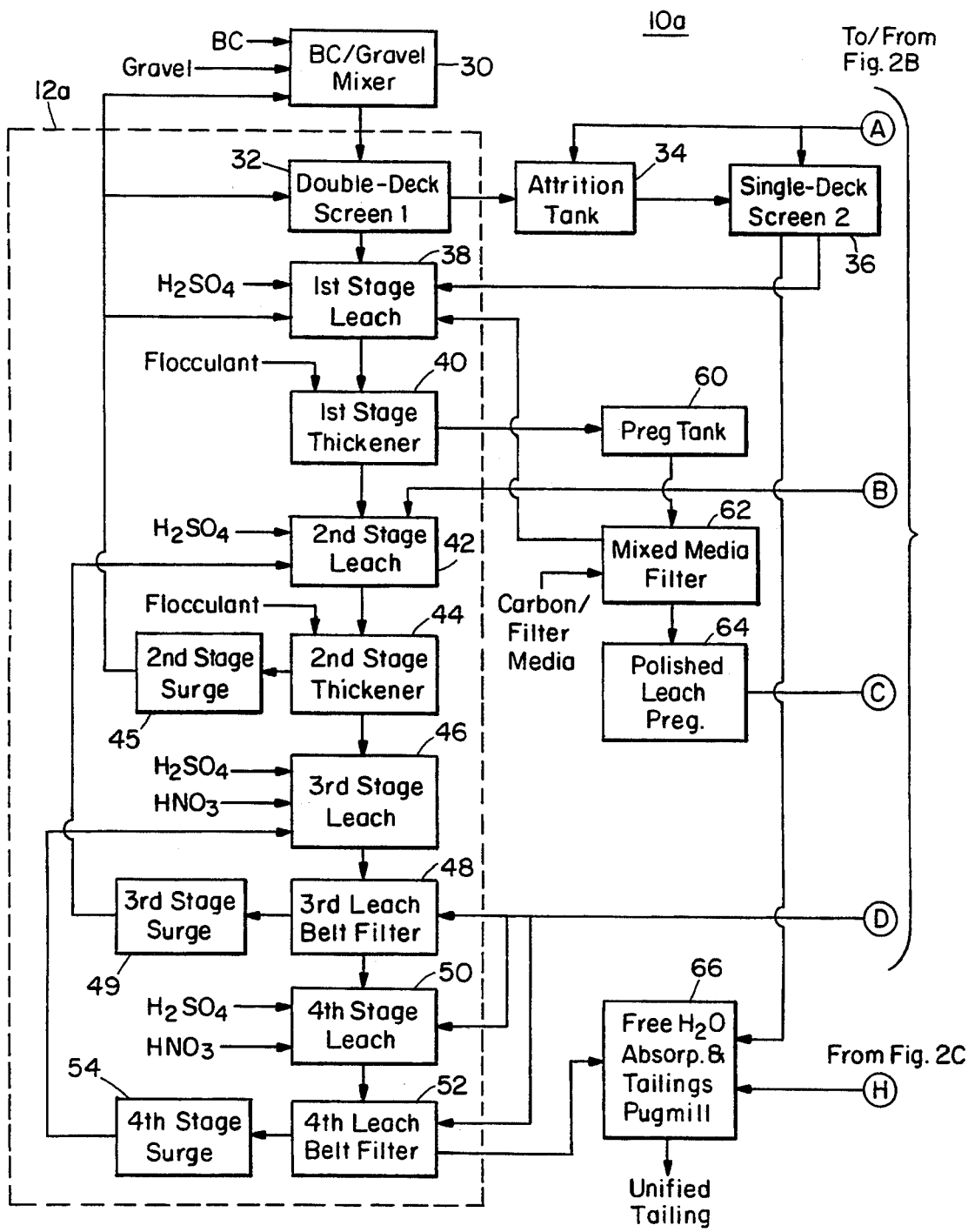
FIG. 2 is a more detailed block diagram of the process of FIG. 1.
Figure 2B:
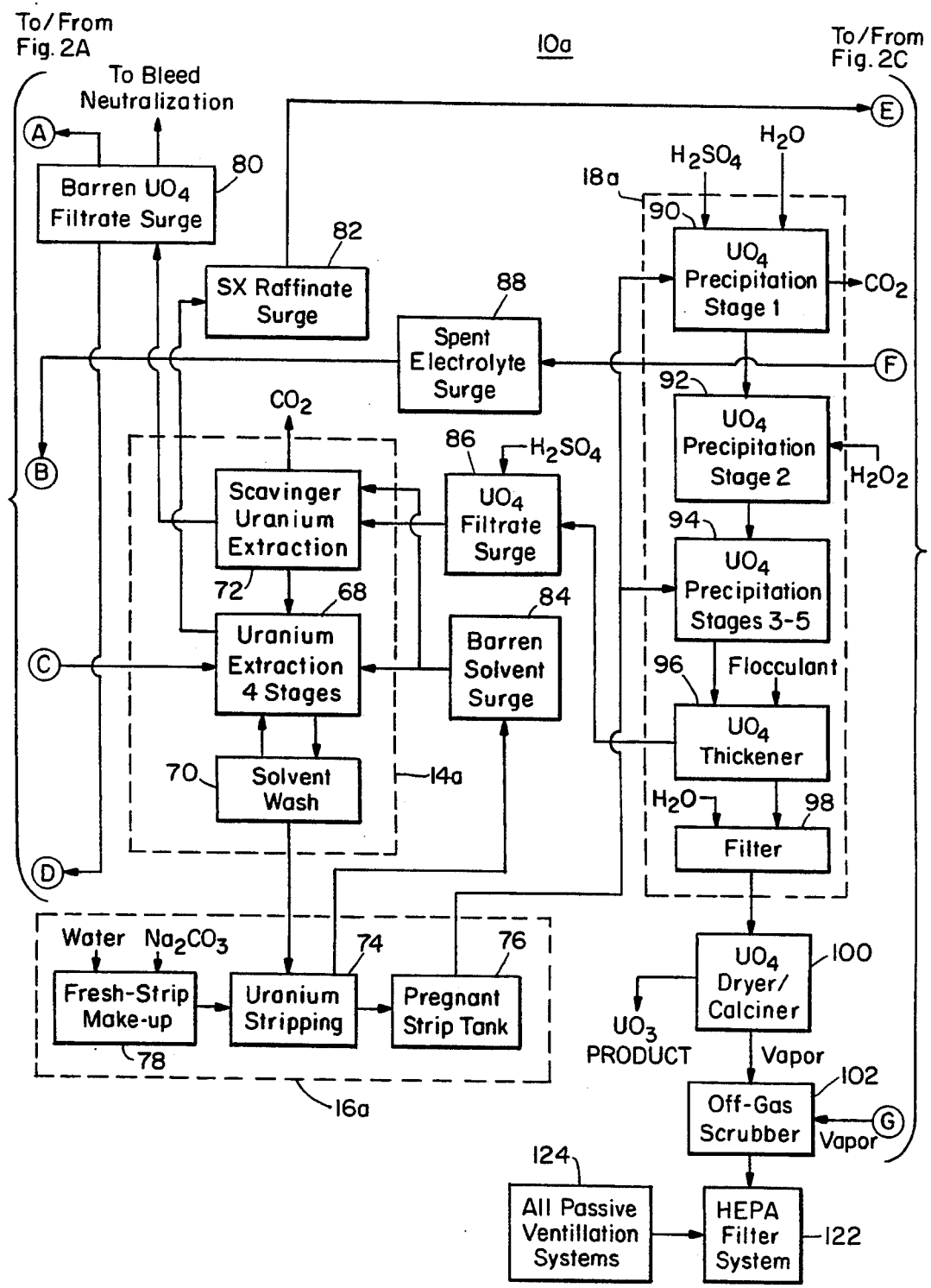
Figure 2C:
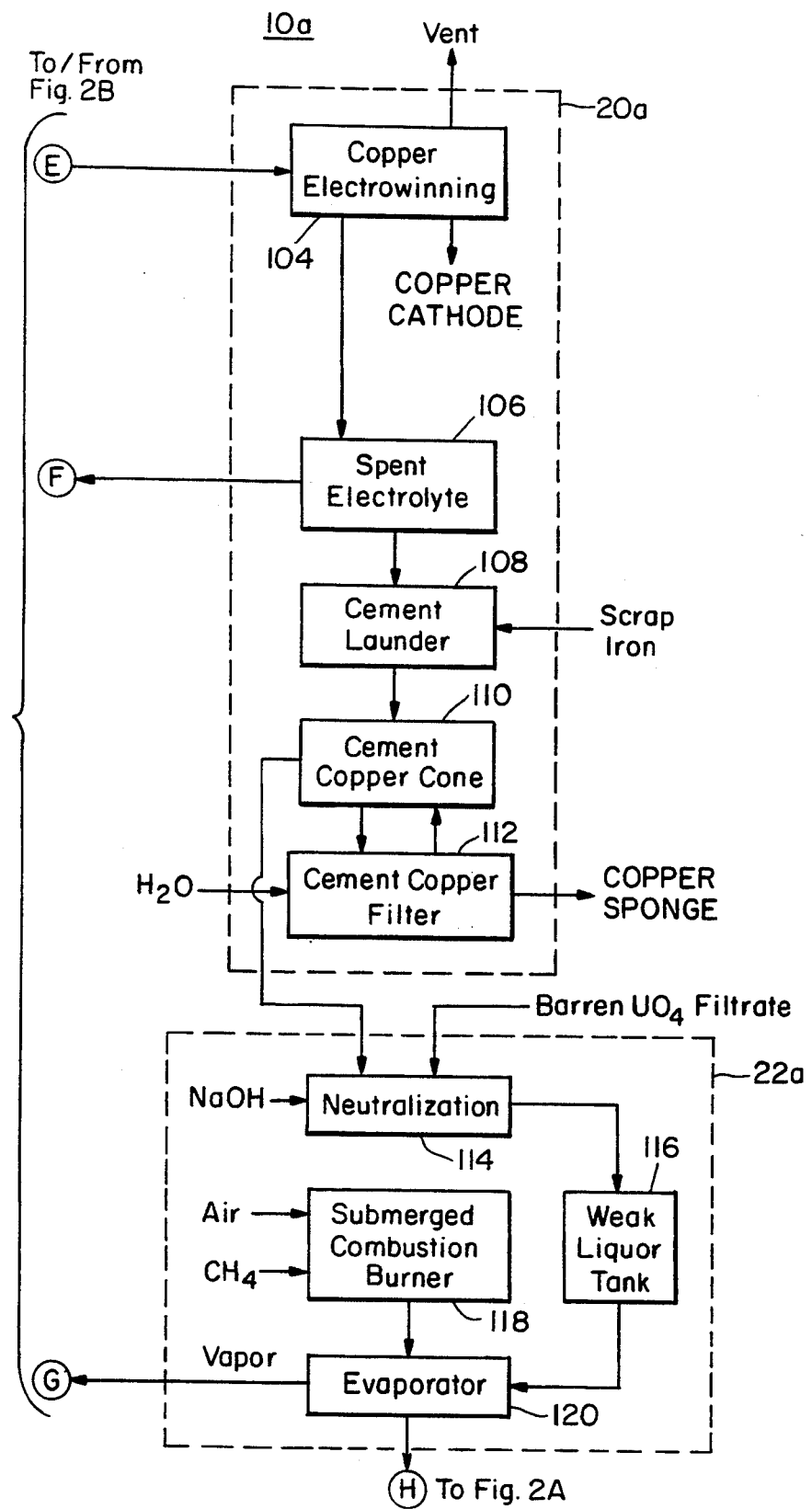

FIG. 2 details a preferred form of the metals removal process of this invention. In this case, the waste stream includes a slurry left over from a uranium pickling operation. The waste includes a number of copper compounds, primarily copper hydroxide, along with uranium oxides. The waste stream is labelled BC for "basin contents". Also input to the process is the top ten inches of gravel forming the bottom of the slurry waste pond.

The contents are passed through a two inch screen into a mix tank 30 to make a batch as a 22% solids slurry. The slurry is pumped across a double deck, $\frac{1}{4}"$ and 48 mesh, screen 32. The material that does not pass through the screen is then attritioned as a 60% solids pulp in tank 34 with barren liquor from the uranium precipitation stage described below. This pulp is then pumped across a second single deck vibrating screen 36 to make a sand-slime separation at 48 mesh. Oversize solids are washed with a spray of barren $UO_4$ filtrate and advanced to tail blending pugmill 66.

The minus 48 mesh materials are provided to first stage leaching tank 38. The basin contents in this example are leached in four stages using sulfuric acid for the first two stages, and both sulfuric acid and nitric acid for the third and fourth stages. Acid concentration through the four stages increases from approximately 20 grams per liter as sulfuric acid in stage one to 300 grams per liter combined sulfuric and nitric acid in stage four. After leaching for two hours in first stage leach tank 38, the leach pulp is transferred to a cone thickener 40 to which a flocculant is added to promote clarification and densify solids to approximately 28%. The thickener overflow having a clarity of less than 50 ppm total suspended solids is pumped to pregnant liquor surge tank 60. This leach solution is then polished through a mixed media filter 62 containing activated carbon and clay to remove any entrained oil and line particulates. Preferably, filter 62 comprises a one micron polypropylene bag filter followed by an activated carbon adsorber. The filter media, solids and oil are recycled through the leach circuit starting at first stage leach tank 38 and eventually report as leach residue to pugmill 66.

The underflow from thickener 40 is advanced to second stage leach tank 42 for a second contact with sulfuric acid, spent electrolyte from tank 88, and recycled third stage leach filtrate. The leaching parameters and equipment are identical with first stage leach 38. The leach pulp is thickened in second stage thickener 44 which is also a cone thickener to which flocculant is added to thicken to approximately 30% solids. The filtrate is held in second stage surge tank 45 and then recycled to mixer 30. The underflow from thickener 44 is releached in a single tank third stage using sulfuric and nitric acids at an elevated temperature of 80° C. using a steam heated panel coil to enhance uranium extraction.

The pulp is retained for live and a half hours in tank 46 to extract residual uranium values to greater than 99%. Solids/liquid separation is effected by filtration on a horizontal belt filter 48 with a single wash stage of barren $UO_4$. The washed filter cake at 77% solids discharges by gravity to fourth stage leach tank 50. The filtrate is held in surge tank 49 and then pumped back to second stage leach 42.

The washed filter cake is leached a fourth time in a single tank again using both sulfuric and nitric acids. Temperature, pulp density and retention time are identical to stage 3. Overall uranium extraction through four stages exceeds 99.9%. Final filtration of tails solids takes place on belt filter 52 identical to belt filter 48. The cake discharges by gravity to a double paddle pugmill 66 for free water absorption with the other tails as described below. The filtrate is pumped back to third stage leach tank 46.

The polished leach solution from the first leach stage is held in tank 64 for metering through uranium extraction step 14a. The polished leach solution is fed to four stage solvent extraction circuit 68 shown in more detail in FIG. 3. Solvent extraction circuit 68 contacts the solution with a tertiary amine (10% Alamine 336 in a kerosene diluent, Kermac 470B) purchased for example from Henkel Corporation. The Kermac 470B is a kerosene-like organic solvent supplied by Kerr-McGee Chemical Corporation. Gravity settlers and pumping mixers are used in each stage of extraction. (The settlers are two feet wide by six feet long, and the mixers are thirty gallon baffled tanks.) Each stage is equipped with recycle piping to adjust the ratio of aqueous to organic content in the mixer. Loaded organic from extraction stage 68 is transferred to single wash stage 70 at approximately four gallons per minute and contacted with a 0.3 gallon per minute flow of barren $UO_4$ filtrate from surge tank 80. This stage mixer-settler dimensions are the same as in the extraction units.

The washed organic loaded with uranium is stripped of its uranium content of about ten to twelve grams per liter to less than 0.05 grams per liter $U_3O_8$ in a two stage strip step 74, using mixers-settlers similar to those used in the extraction step. Stripping is accomplished with a 1.5 gpm stream of 100 grams per liter soda ash solution producing a pregnant strip solution containing 20 to 30 grams per liter uranium. An additional solvent extraction stage 72 is used to scavenge residual uranium values contained in the barren strip solution following $UO_4$ precipitation. Step 72 uses barren organic from barren solvent surge 84 to remove about 1.5 to 2 grams per liter uranium and produce a barren UO₄ filtrate containing less than 0.05 grams per liter uranium that is held in surge tank 80. The barren organic is held in surge tank 84 and recycled to the fourth extraction stage at approximately four gallons per minute.

The pregnant strip solution is held in tank 76 and metered into a continuous peroxide precipitation circuit 18a at 1.6 gallons per minute. Dilution water at 0.5 to 0.6 gallons per minute is added to the first UO₄ precipitation stage 90 to lower sulfate concentration to improve the UO₄ stripping chemistry. Sulfuric acid is also metered into the first of the series of five 100 gallon tanks to adjust the free acid to a pH of 4.2±0.003 units for optimum precipitation conditions. After mixing, the solution is moved to stage two tank 92 into which 45 cc per minute of 32.8% hydrogen peroxide is pumped. The successive three tanks are needed to allow a four hour retention time for the precipitation chemistry to proceed to completion. About 36 pounds per hour of a hydrated UO₄ precipitate at about 2.6% solids is then pumped to cone thickener 96 which yields a 60% solids underflow and a clear overflow with the addition of minimal flocculant. This 60% slurry is then withdrawn to a tilting pan filter to produce a washed UO₄ cake which is loaded onto stainless trays and calcined in a forced air electric oven at 350° C. for four to six hours. The gasses from the calciner are vented to a packed column scrubber 102 for capture of any particulate carryover. The UO₃ calcine may then be removed and recycled as desired.

Raffinate from the fourth extraction stage of step 68 is stored in surge tank 82 to provide a surge capacity and also to separate any coalesced organic for return to the solvent extraction stage. The raffinate may be pumped through a polish filter/activated carbon bed to remove entrained and soluble organics before advancing to copper electrowinning stage 104. Preferably, the copper is plated out of solution in a single stage of three cells using titanium cathodes and oxygen-evolving platinum-iridium coated titanium mesh anodes. The copper concentration of the raffinate in the electrowinning circuit is reduced from 18 to 25 grams per liter to about 5 grains per liter. The cells are operated at 15 amps per square foot. A high internal recycle rate of spent electrolyte permits a discharge concentration of 5 to 6 grams per liter copper to holding tank 106. The spent electrolyte is divided with 70% being recycled to the second acid leach stage 42 through surge tank 88, with the balance advanced out of the circuit as a bleed of the soluble components, primarily iron, magnesium, chloride and nitrate.

The remaining copper is then removed from the spent electrolyte in a cementation step 108 in a launder-design with riffle plates using a six inch deep charge of degreased iron punchings. The cementation is preferably run in 4,000 gallon batches with recirculation and continuous removal of copper particulate with cone thickener 110. This assures a barren effluent and complete conversion of $Cr^{+6}$ to $Cr^{+3}$. The copper cement is then collected on pan filter 112, washed, and transferred as a 20% moisture filter cake. Barren cement solution free of copper to less than five ppm and containing only trivalent chromium is pumped continuously to single tank neutralization stage 114 with a retention time of two hours. Neutralization pH is controlled at 5.0–6.5 with sodium hydroxide.

The neutralized liquor contains predominately dissolved sulfate salts of magnesium, ferrous iron, and sodium. This solution tailing is held in weak liquor tank 116 and pumped continuously to a submerged combustion evaporator 120. The evaporated strong liquor is concentrated to 500 grams per liter total dissolved solids and pumped to the tails pugmill 66 for free water absorption and cooling with the leach tails and the screened, attritioned gravel. The submerged combustion burner 118 is fired with propane and 20% excess air through a downcomer or direct contact of 2,000° F. combustion gasses with the solution to evaporate about 2,000 pounds per hour of water. The combustor off gas is scrubbed in thirty inch diameter packed column 102 to remove liquid entrainment and any fume produced in the evaporation process. The scrub liquor makeup is fresh water and is recycled to a concentration of 50 grams per liter total dissolved solids before bleeding to the strip makeup tank or the leach circuit. The same scrubber also receives the vent gas and any particulate from the UO₄ drying oven.

Figure 3:
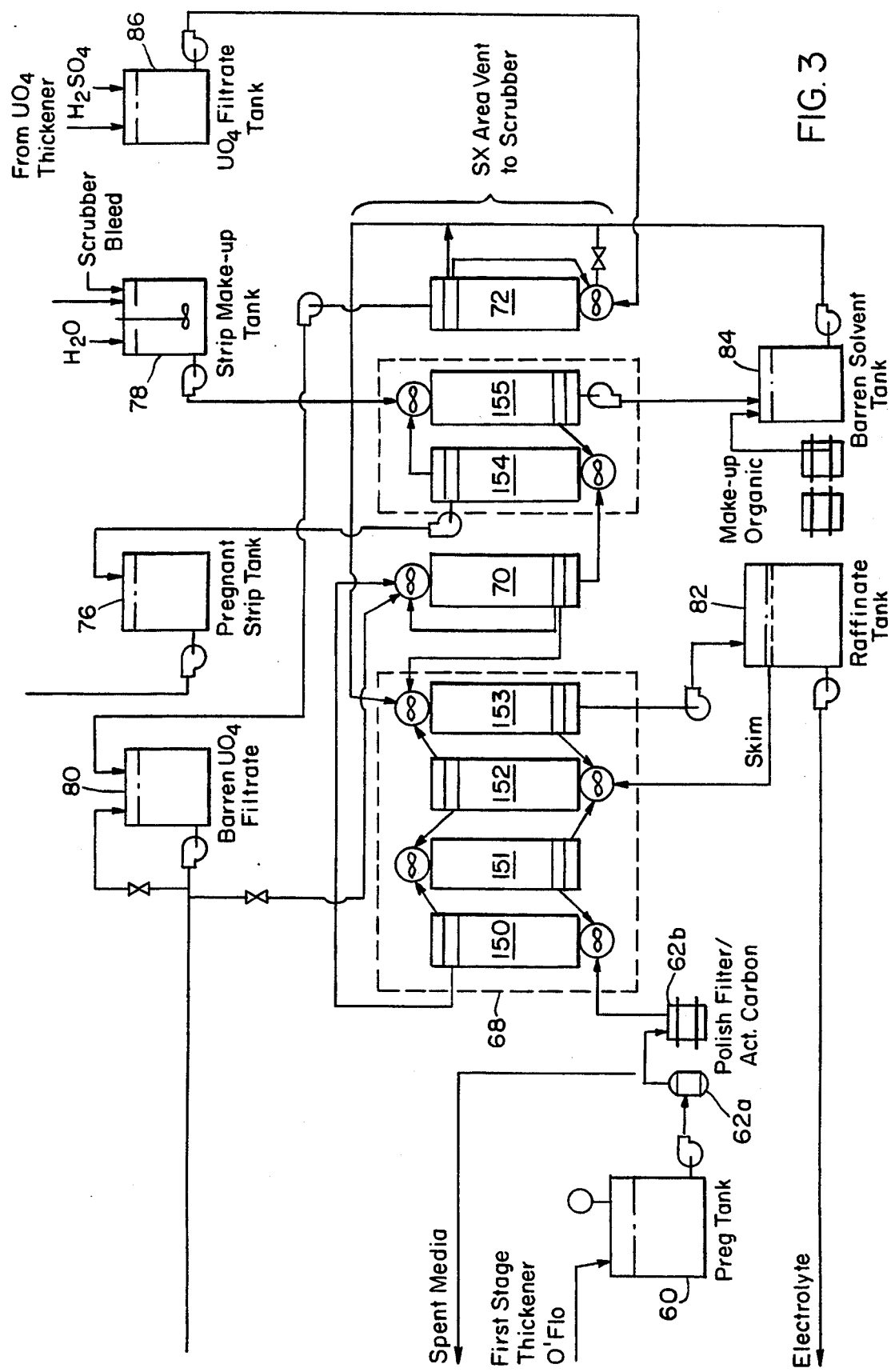
FIG. 3 is a more detailed block diagram of the solvent extraction and uranium stripping processes of the process of FIG. 2.

Uranium extraction step 68 and uranium stripping step 74 are shown in more detail in FIG. 3. The thickener overflow from the first stage thickener 40, FIG. 2, is buffered in tank 60 and metered through polish filter and activated carbon filter 62a and 62b. The liquid is then passed through uranium extraction step 68 including stages 150 through 153 each including a gravity settler and pumping mixer as described above with a counter-current flow of barren solvent from tank 84. The aqueous phase from the extraction stages is then stored in raffinate surge 82 and becomes the feed to the copper recovery stage 20a, FIG. 2. The loaded solvent is provided to solvent wash 70 and contacted with a flow of barren UO₄ filtrate from tank 80. Wash stage 70 is a mixer-settler with the same dimensions as extraction units 150 through 153. The loaded solvent is then provided to two stage uranium stripping operation 74 using mixer-settlers 154 and 155 similar to those used in extraction section 68. The soda ash solution is provided from strip makeup tank 78. Barren solvent is moved to surge tank 84 and the pregnant strip solution is moved to strip tank 76. Scavenger uranium extraction stage 72 is fed from the UO₄ filtrate surge tank 86 to strip residual uranium values contained in the barren strip solution following UO₄ precipitation using barren organic from tank 84.

Other metals that will be removed in the electrowinning/cementation steps are uranium, silver, bismuth and molybdenum. The nature of the tertiary amine solvent extraction organic is such that only anionic species of the metals are extracted. Because of this, the solvent extraction system is specific for uranium and molybdenum.

The following table lists the process criteria for operation of the system depicted in FIGS. 2 and 3 for a feed stream containing on a deoiled, dry basis about 22.5% $Cu(OH)_2$, 5.5% $CuCO$, 11.4% $CaU_2O$, 40.4% $SiO_2$ and 10.7% MgOH, with the remainder being other calcium, iron, aluminum and potassium compounds:

| Sludge/Gravel Mixer | |
|---|---|
| Retention | 900 minutes |
| Pulp density | 21% solids |
| Temperature | Ambient, 51° C. |
| Copper dissolution | 80% |
| Uranium dissolution | 30% |
| Attrition | |

-continued

| | |
|---|---|
| Retention | 900 minutes |
| Pulp density | 60% solids |
| Temperature | Ambient, 41° C. |
| First stage leach | |
| Retention | 50 minutes, 2 vessels in series |
| Pulp density | 5.9% solids |
| Temperature | Ambient, 53° C. |
| Acid control | 20 g/L free $H_2SO_4$ |
| Copper dissolution | 60% |
| Uranium dissolution | 86% |
| First stage residue thickener | |
| Feed density | 5.9% solids |
| Unit area | 11 $ft^2$/tpd solids |
| Flocculant addition | 4 lb/ton residue |
| Terminal density | 28% solids |
| Second stage leach | |
| Retention | 60 minutes, 2 vessels in series |
| Pulp density | 6.9% solids |
| Temperature | Ambient, 52° C. |
| Acid control | 55 g/L free $H_2SO_4$ |
| Copper dissolution | 99.3% |
| Uranium dissolution | 94.0% |
| Second stage residue thickener | |
| Feed density | 6.9% solids |
| Unit area | 12 $ft^2$/tpd solids |
| Flocculant addition | 4 lb/ton residue |
| Terminal density | 30% solids |
| Third stage leach | |
| Retention | 180 minutes |
| Pulp density | 18% solids |
| Temperature | 80° C. |
| Acid control | 50 g/l free $H_2SO_4$ |
| | 20 g/L $HNO_3$ |
| Copper dissolution | 60% |
| Uranium dissolution | 80% |
| Third stage residue filter | |
| Feed density | 18.0% solids |
| Unit rate | 25 lb/hr/$ft^2$ |
| Liquid rate | 0.2 gpm/$ft^2$ |
| Cake moisture | 70% |
| Wash solution | Process water |
| Wash volume | 1.2 displacements |
| Fourth stage leach | |
| Retention | 2540 minutes |
| Pulp density | 33% solids |
| Temperature | 80° C. |
| Acid control | 200 g/L free $H_2SO_4$ |
| | 100 g/l $HNO_3$ |
| Uranium dissolution | 50% |
| Fourth stage residue filter | |
| Feed density | 33% solids |
| Unit rate | 25 lb/hr/$ft^2$ |
| Liquid rate | 0.2 gpm/$ft^2$ |
| Cake moisture | 70% |
| Wash solution | Process water |
| Wash volume | 1.2 displacements |
| Leach solution surge/SX feed | |
| Retention | 4.5 hours |
| Barren solvent Surge | |
| Retention | 80 minutes (full) |
| Uranium extraction | |
| Stages | 4 |
| Solvent Composition | 10% Tertiary amine |
| | 10% decyl alcohol |
| | 80% kerosine |
| Solvent/aqueous ratio | 0.7/1 before recycle |
| Mixer ratio | 1/1 solvent/aqueous |
| Retention | 1.6 minutes |
| Settler area | 0.8 $ft^2$/gpm |
| Loaded solvent wash | |
| Stages | 1 |
| Wash solution | Water |
| Solvent/aqueous ratio | 20/1 before recycle |
| Mixer ratio | 3/1 solvent/aqueous |
| Retention/ | 2.4 minutes |
| Settler area | 1.2 $ft^2$/gpm |
| Strip make-up | |
| Strip solution | 100 g/L $Na_2CO_3$ |
| Retention | 10 hours |
| Uranium stripping | |
| Stages | 2 |
| Solvent/aqueous ratio | 3.7/1 |
| Mixer ratio | 3.7/1 solvent/aqueous |
| Retention | 2.5 minutes |
| Settler area | 0.8 $ft^2$/gpm |
| Pregnant strip surge | |
| Retention | 12 hours |
| Uranium precipitation | |
| Retention | 1 batch/shift |
| $H_2O_2$ addition | 0.21 lb/lb U |
| Control | 4.2 pH with $H_2SO_4$ |
| Precipitate density | 1.7% solids |
| Uranium peroxide filter | |
| Feed density | 3.6% solids |
| Unit rate | 28 lb/hr/$ft^2$ |
| Liquid rate | 1.5 gpm/$ft^2$ |
| Cake moisture | 40% |
| Wash solution | Fresh water |
| Wash volume | 3 displacements |
| Uranium filtrate surge | |
| Retention | 800 minutes |
| Uranium dryer/calciner | |
| Temperature | 500° C. |
| Hearth area | 3 lb/hr/$ft^2$ |
| Copper Electrowinning | |
| Feed tank retention | 150 minutes |
| Feed electrolyte | 19 g/L copper |
| Spent electrolyte | 6 g/L copper |
| Recovery per pass | 60% |
| Temperature | 45° C. |
| Electrode spacing | 4.5 inches |
| Cathode current density | 15 amps/$ft^2$ |
| Cell voltage | 2.5 volts |
| Current efficiency | 80% |
| Spent surge retention | 50 minutes |
| Copper Precipitation | |
| Retention | 120 minutes |
| Reductant | Scrap iron |
| Precipitated slurry | 0.6% solids |
| Copper filter | |
| Feed density | 60% solids |
| Unit rate | 50 lb/hr/$ft^2$ |
| Liquid rate | 0.9 gpm/$ft^2$ |
| Cake moisture | 80% |
| Wash solution | Fresh Water |
| Neutralization | |
| Retention | 50 minutes |
| Reagent | Sodium hydroxide |
| Control | 7.0 pH |
| Evaporator | |
| Feed tank retention | 200 minutes |
| Evaporated slurry | 93% solids (on cooling) |
| Total tailings repulp | |
| Retention | 10 minutes |
| Pulp density | 73% solids |

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A process for removing uranium and a non-actinide second metal contained in a waste, comprising:
   dissolving the uranium and the second metal in a first acidic aqueous solution;
   removing the dissolved uranium from the first acidic aqueous solution by extraction using an organic solvent;
   stripping the uranium from the organic solvent by redissolving in a second aqueous solution;

precipitating the uranium from the second aqueous solution; and removing the second metal from the first aqueous solution.

2. The metals removal process of claim 1 in which dissolving the uranium and the second metal includes contacting the metals with an acidic solution.

3. The metals removal process of claim 1 in which contacting the metals with an acidic solution includes a multiple stage acid leaching process.

4. The metals removal process of claim 3 in which said multiple stage acid leaching process includes an increased leachate acid concentration from the first to the last stage.

5. The metals removal process of claim 1 in which removing the dissolved uranium includes contacting the first aqueous solution with an amine.

6. The metals removal process of claim 1 in which removing the dissolved uranium includes a multiple stage solvent extraction process.

7. The metals removal process of claim 6 in which said solvent extraction process is a multiple stage countercurrent process.

8. The metals removal process of claim 1 in which stripping the uranium from the organic solvent includes contacting the solvent with a soda ash solution.

9. The metals removal process of claim 1 in which stripping the uranium from the organic solvent includes a multiple stage countercurrent stripping operation.

10. The metals removal process of claim 1 further including removing remaining dissolved uranium from the second aqueous solution after uranium precipitation from the second aqueous solution.

11. The metals removal process of claim 10 in which removing remaining dissolved uranium includes extracting the uranium with the organic solvent.

12. The metals removal process of claim 1 in which precipitating the uranium includes contacting the second aqueous solution with an oxidizer.

13. The metals removal process of claim 12 in which the oxidizer is hydrogen peroxide.

14. The metals removal process of claim 1 in which removing the second metal includes electrowinning.

15. The metals removal process of claim 1 in which removing the second metal includes cementation.

16. The metals removal process of claim 15 in which the cementation includes circulating the first aqueous solution over iron.

17. The metals removal process of claim 1 further including calcining the precipitated uranium.

18. The metals removal process of claim 1 further including neutralizing the first aqueous solution after second metal removal.

19. The metals removal process of claim 18 further including concentrating the neutralized solution by evaporation.

20. The metals removal process of claim 1 in which the second metal includes copper.

21. The metals removal process of claim 3 in which the acid leaching process uses sulfuric and nitric acids.

22. A process for removing uranium and copper from an aqueous waste, comprising:

dissolving the uranium and copper in a multi-stage acid leaching process using sulfuric and nitric acids, in which solids are removed at each leaching stage, and the remaining liquid is returned to the previous leaching stage for all but the first leaching stage;

removing the dissolved uranium from the liquid from the first leaching stage using a countercurrent multi-stage uranium solvent extraction process;

stripping the uranium from the solvent using an aqueous soda ash solution for dissolving the uranium therein;

returning the remaining stripped solvent to the solvent extraction process;

precipitating uranium peroxide from the aqueous soda ash solution with an acid and hydrogen peroxide;

calcining the precipitated uranium peroxide to convert it to uranium trioxide;

electrowinning copper from the liquid from the first leaching stage after solvent extraction;

reducing and precipitating copper in the liquid after electrowinning using an iron-exchange cementation process;

neutralizing the liquid after cementation; and concentrating the neutralized liquid by evaporation to produce a disposable slurry.

* * * * *